(12) United States Patent
Lee

(10) Patent No.: US 8,332,762 B2
(45) Date of Patent: Dec. 11, 2012

(54) MOBILE TERMINAL AND MESSAGE INBOX SEARCHING METHOD THEREOF

(75) Inventor: Dong-Cheon Lee, Anyang (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 12/501,155

(22) Filed: Jul. 10, 2009

(65) Prior Publication Data

US 2010/0011317 A1 Jan. 14, 2010

(30) Foreign Application Priority Data

Jul. 11, 2008 (KR) .................. 10-2008-0067765

(51) Int. Cl.
*G06F 3/00* (2006.01)

(52) U.S. Cl. ......... 715/758; 715/823; 715/764; 709/206

(58) Field of Classification Search ....... 707/3, E17.075; 709/206; 715/784
See application file for complete search history.

(56) References Cited

U.S. PATENT DOCUMENTS

| | | | |
|---|---|---|---|
| 6,487,583 B1 * | 11/2002 | Harvey et al. ................. | 709/204 |
| 7,620,705 B2 * | 11/2009 | Hodgson et al. .............. | 709/220 |
| 2002/0026331 A1 * | 2/2002 | Case ................................ | 705/3 |
| 2004/0243844 A1 * | 12/2004 | Adkins .......................... | 713/201 |
| 2005/0144241 A1 * | 6/2005 | Stata et al. ..................... | 709/206 |
| 2005/0235034 A1 * | 10/2005 | Chen et al. .................... | 709/206 |
| 2005/0246423 A1 * | 11/2005 | Starbuck et al. ............. | 709/206 |
| 2005/0267975 A1 * | 12/2005 | Qureshi et al. ................ | 709/229 |
| 2006/0190308 A1 * | 8/2006 | Janssens et al. ............... | 705/5 |
| 2006/0227943 A1 | 10/2006 | Yan | |
| 2006/0282819 A1 * | 12/2006 | Graham et al. ............... | 717/113 |
| 2006/0286968 A1 * | 12/2006 | Klassen et al. .............. | 455/412.1 |
| 2007/0168447 A1 * | 7/2007 | Chen et al. .................... | 709/207 |
| 2007/0173233 A1 * | 7/2007 | Vander Veen et al. ........ | 455/413 |

(Continued)

FOREIGN PATENT DOCUMENTS

EP 2 007 121 A1 6/2007

OTHER PUBLICATIONS

Blaine Bell, Last Updated on Nov. 26, 2001, http://www.blainebell.org/SpaceManager.*

(Continued)

*Primary Examiner* — Tuyetlien Tran
*Assistant Examiner* — Abimbola Ayeni
(74) *Attorney, Agent, or Firm* — Birch Stewart Kolasch & Birch, LLP

(57) ABSTRACT

A mobile terminal including a wireless communication unit configured to establish an Instant Messaging (IM) service with at least one other terminal, an input unit configured to receive a designation signal corresponding to a designation of a portion of information included in chat content input during the IM session, a memory configured to store the designated portion of information, a controller configured to receive an input search signal requesting a message inbox including at least one previous IM session conducted on the mobile terminal be searched for the designated portion of information, and to search the message inbox to determine if the at least one previous IM session includes the designated portion of information upon receiving the input search signal, and a display configured to display a part of chat contents of the at least one IM session that includes the designated portion of information when the searching step determines the at least one previous IM session includes the designated portion of information.

16 Claims, 12 Drawing Sheets

U.S. PATENT DOCUMENTS

| | | |
|---|---|---|
| 2007/0242656 A1 | 10/2007 | Klassen et al. |
| 2007/0250583 A1* | 10/2007 | Hardy et al. .................. 709/206 |
| 2008/0005668 A1* | 1/2008 | Mavinkurve et al. ......... 715/526 |
| 2008/0091408 A1* | 4/2008 | Roulland et al. ................... 704/9 |
| 2008/0102863 A1* | 5/2008 | Hardy et al. .................. 455/466 |
| 2008/0141247 A1* | 6/2008 | Saravanan ..................... 718/100 |
| 2009/0150397 A1* | 6/2009 | Chen et al. ........................ 707/9 |
| 2009/0215476 A1* | 8/2009 | Tysowski ...................... 455/466 |

OTHER PUBLICATIONS

HTML Code Tutorial, Accessible by Jun. 9, 2004, http://www.htmlcodetutorial.com/linking/linking_famsupp_129.html.*

* cited by examiner

| | Classification |
|---|---|
| 1 | Phone number |
| 2 | Place |
| 3 | Time |
| .. | .. |

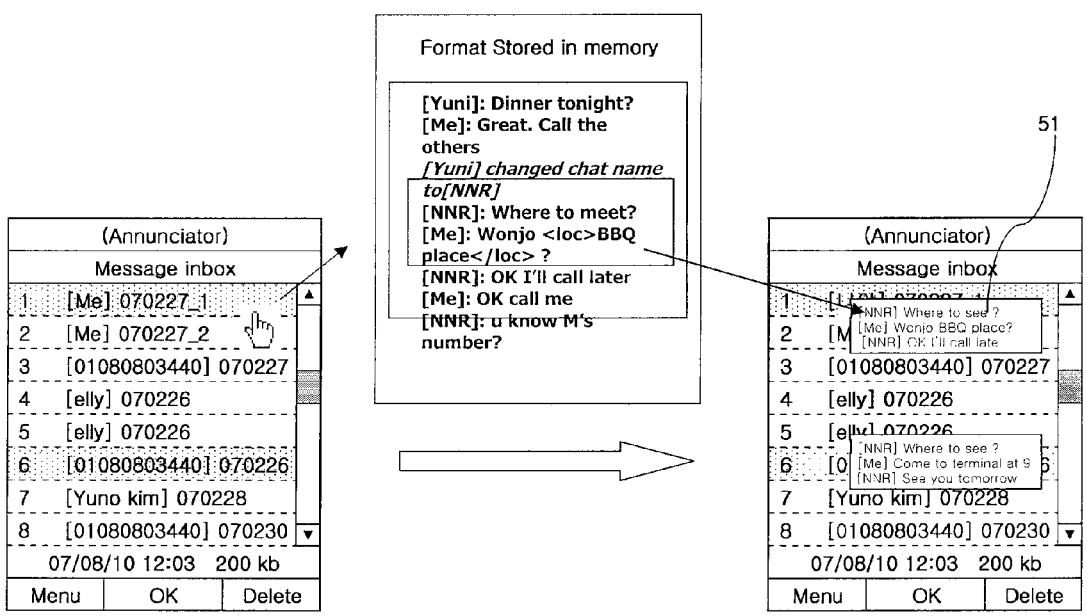
FIG. 12A  FIG. 12B

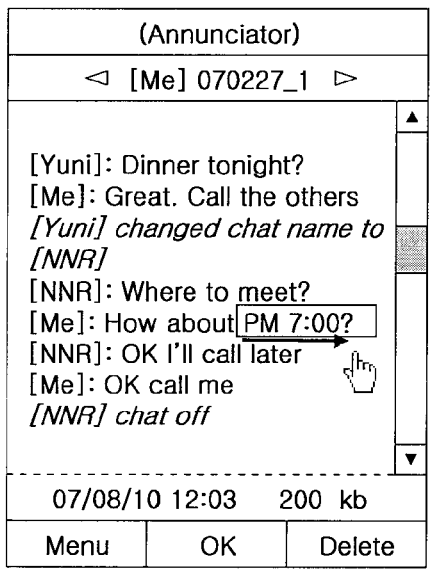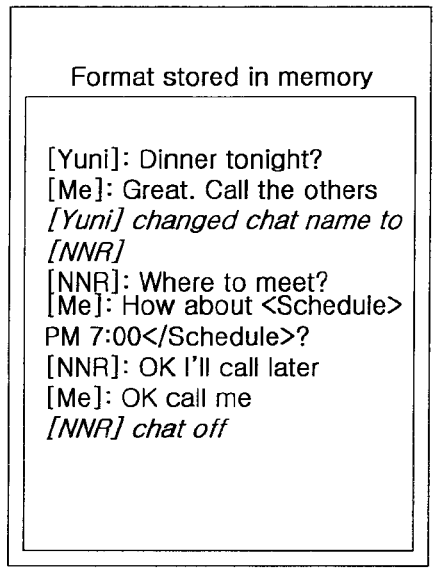
FIG. 15A      FIG. 15B
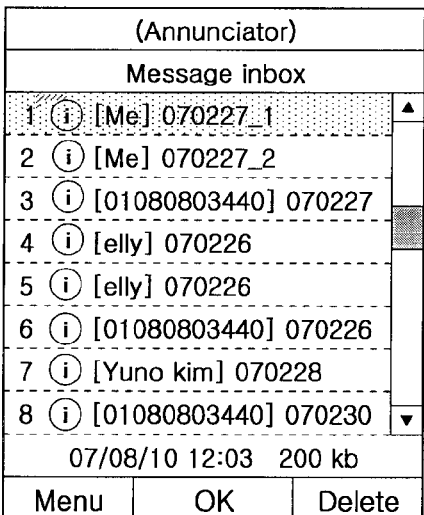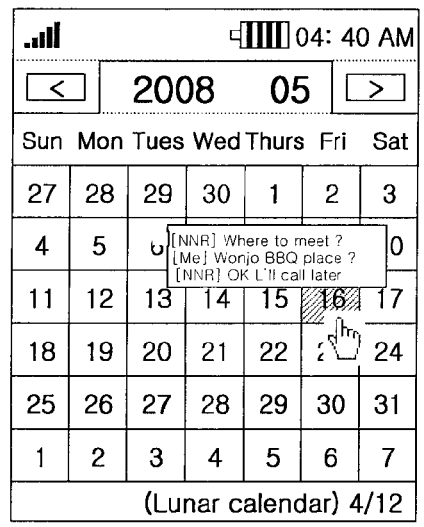
FIG. 15C      FIG. 15D
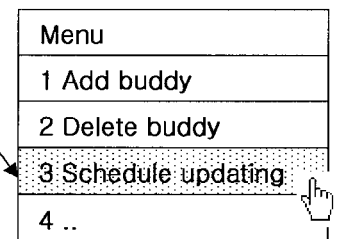

MOBILE TERMINAL AND MESSAGE INBOX SEARCHING METHOD THEREOF

CROSS REFERENCE TO RELATED APPLICATIONS

The present application claims priority to Korean Application No. 10-2008-0067765 filed in Korea on Jul. 11, 2008, the entire contents of which is hereby incorporated by reference in its entirety.

BACKGROUND OF THE INVENTION

1. Field of the Invention

The present invention relates to a mobile terminal and corresponding method for searching content of a message inbox.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. In addition, mobile terminals can also receive broadcast and multicast signals, which permit viewing of content such as videos and television programs.

Efforts are ongoing to support and increase the functionality of mobile terminals. Such efforts include software and hardware improvements, as well as changes and improvements in the structural components which form the mobile terminal. Users can also use Instant Message (IM) services on their mobile terminals to chat with other users. That is, the IM service supports real time communications allowing users in an online state on the Internet or IP to send simple messages (notes, files, data, etc.) in real time. Thus, in the IM service, when a user sends a message, the message is output to a screen of a counterpart (e.g., another party), enabling real time communications such that users can chat with each other. However, the IM service provided with the mobile terminal is limited in nature making it inconvenient for the user to use the IM service.

SUMMARY OF THE INVENTION

Accordingly, one object of the present invention is to address the above-noted and other problems.

Another object of the present invention is to provide a mobile terminal and corresponding method for conveniently searching chat content stored in a message (chat) inbox.

Another object of the present invention is to provide a mobile terminal and corresponding method for providing a preview function of content of each list in a searching list from the message inbox.

To achieve these and other advantages and in accordance with the purpose of the present invention, as embodied and broadly described herein, the present invention provides in one aspect a method of controlling a mobile terminal, and which includes establishing an Instant Messaging (IM) service with at least one other terminal, designating a portion of information included in chat content input during the IM session, storing the designated portion of information in a memory of the mobile terminal, receiving an input search signal requesting a message inbox including at least one previous IM session conducted on the mobile terminal be searched for the designated portion of information, searching the message inbox to determine if the at least one previous IM session includes the designated portion of information upon receiving the input search signal, and displaying a part of chat contents of the at least one IM session that includes the designated portion of information when the searching step determines the at least one previous IM session includes the designated portion of information.

In another aspect, the present invention provides a mobile terminal including a wireless communication unit configured to establish an Instant Messaging (IM) service with at least one other terminal, an input unit configured to receive a designation signal corresponding to a designation of a portion of information included in chat content input during the IM session, a memory configured to store the designated portion of information, a controller configured to receive an input search signal requesting a message inbox including at least one previous IM session conducted on the mobile terminal be searched for the designated portion of information, and to search the message inbox to determine if the at least one previous IM session includes the designated portion of information upon receiving the input search signal, and a display configured to display a part of chat contents of the at least one IM session that includes the designated portion of information when the searching step determines the at least one previous IM session includes the designated portion of information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 12A and 12B are overviews of display screens illustrating displaying of summary of each list when the list of the message inbox is scrolled according to a second embodiment of the present invention;

FIGS. 15A to 15D are overviews of display screens illustrating designating content related to a schedule and automatically updating a scheduler according to another embodiment of the present invention.

DETAILED DESCRIPTION OF THE INVENTION

Reference will now be made in detail to the preferred embodiments of the present invention, examples of which are illustrated in the accompanying drawings.

A mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

Figure 1:
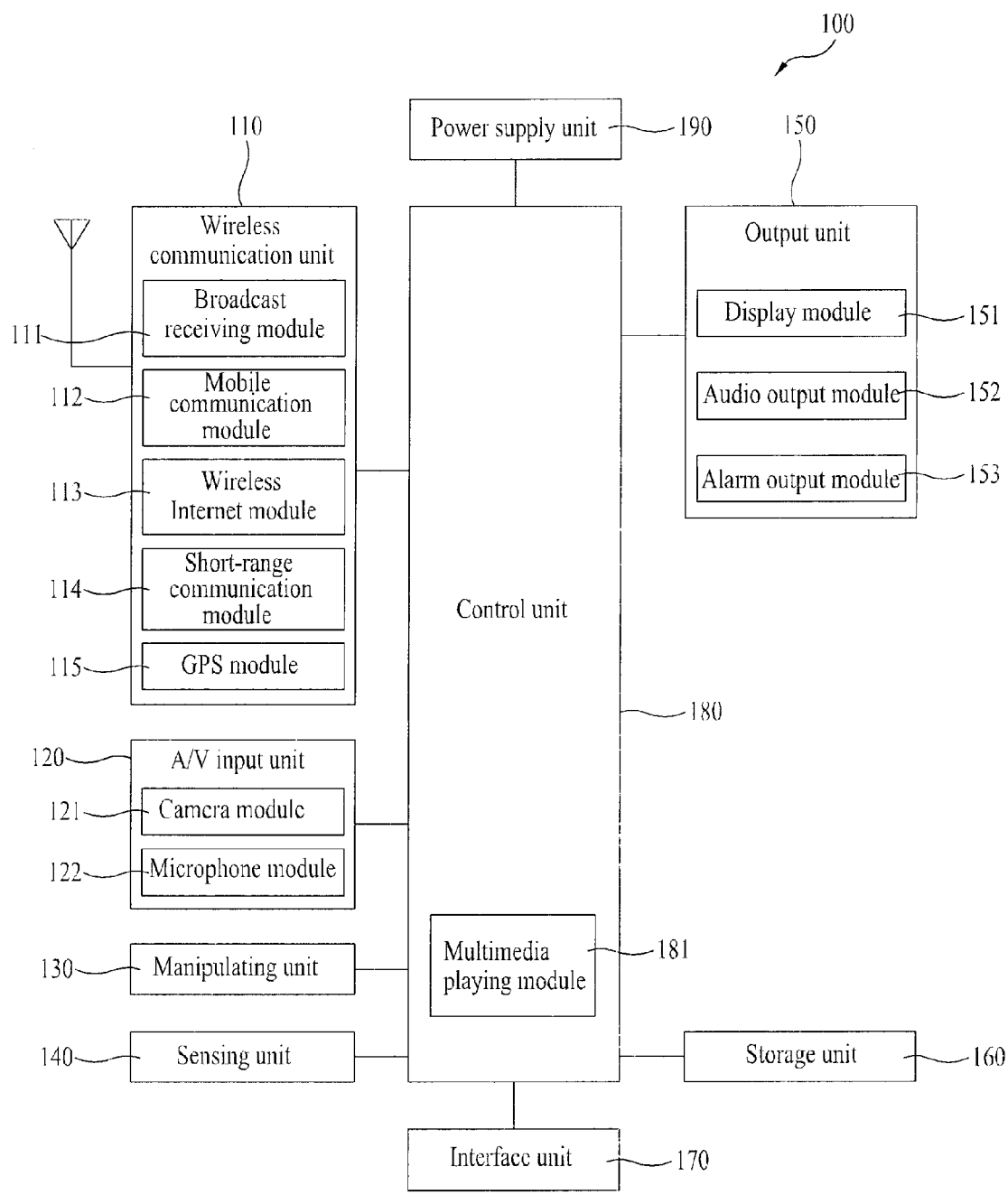
FIG. 1 is a block diagram of a mobile terminal according to an embodiment of the present invention.

FIG. 1 is a block diagram illustrating a mobile terminal according to one embodiment of the present invention. As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but it is understood that implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 may include a Global Position System (GPS) module.

In addition, the GPS module may receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. The A/V input unit 120 may include a camera 121 and a microphone 122. Further, the camera 121 receives and processes image frames of still pictures or video obtained by image sensors in a video call mode or a capturing mode. The processed image frames may then be displayed on a display module 151.

Also, the image frames processed by the camera 121 may be stored in the memory 160 or transmitted to the exterior via the wireless communication unit 110. Two or more cameras 121 may be provided according to the configuration of the mobile terminal. The microphone 122 may receive an external audio signal via a microphone while the mobile terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen. Further, the sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Here, the sensing unit 140 may include a proximity sensor.

The proximity sensor may be disposed within or near the touch screen. Further, the proximity sensor is a sensor for detecting the presence or absence of an object relative to a certain detection surface or an object that exists nearby by using the force of electromagnetism or infrared rays without a physical contact. Thus, the proximity sensor has a considerably longer life span compared with a contact type sensor, and it can be utilized for various purposes. Examples of the proximity sensor may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like.

An operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor, if the touch screen is an electrostatic type, the approach of a pointer (stylus) can be detected based on a change in a field according to the approach of the pointer. Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 may receive data from an external device, or be provided with power and accordingly transfer the received data or power to each component within the mobile terminal 100 or transfer data of the mobile terminal 100 to an external device. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals and power inputted from the cradle may operate as a signal for recognizing that the mobile terminal 100 has accurately been mounted to the cradle.

The output unit 150 is configured to output an audio signal, a video signal or an alarm signal, and may include the display module 151, an audio output module 152, an alarm output module 153, and the like. Further, the display module 151 may output information processed in the mobile terminal 100. For example, when the mobile terminal is operating in a phone call mode, the display module 151 provides a User Interface (UI) or a Graphic User Interface (GUI) which includes information associated with the call. As another example, if the mobile terminal is in a video call mode or a capturing mode, the display module 151 may additionally or alternatively display images captured and/or received, UI, or GUI.

Meanwhile, as mentioned above, a touch screen can be configured as the display module 151 and the touchpad are layered with each other to work in cooperation with each other. This configuration permits the display module 151 to function both as an input device and an output device. The display module 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays may be called transparent displays. A representative example of the transparent display may include a Transparent Organic Light Emitting Diode (TOLED), and the like. Further, the mobile terminal 100 may include two or more of such displays 151. For example, the mobile terminal 100 may simultaneously include an external display (not shown) and an internal display (not shown).

Further, the audio output module 152 may output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

In addition, the alarm output module 153 may output a signal to inform a generation of event associated with the mobile terminal 100. Alarm events may include a call received, message received, user input received and the like. In addition to generating the audio or video signal, the alarm output module 153 may also inform the event generation in different manners, for example, by providing tactile sensations (e.g., vibration) to a user. The alarm output module 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display module 151 or the audio output module 152.

Further, the memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181 which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2 and 3. Further, the mobile terminal may be implemented in a variety of different configurations. Examples of such configurations include a folder type, slide type, bar type, rotating type, swing type or the like. The present description in FIGS. 2 and 3 relates to a slide-type mobile terminal, but the present invention is not limited to the slide-type mobile terminal, and can be applied to other types of terminals including the above-mentioned types of terminals.

Figure 2:
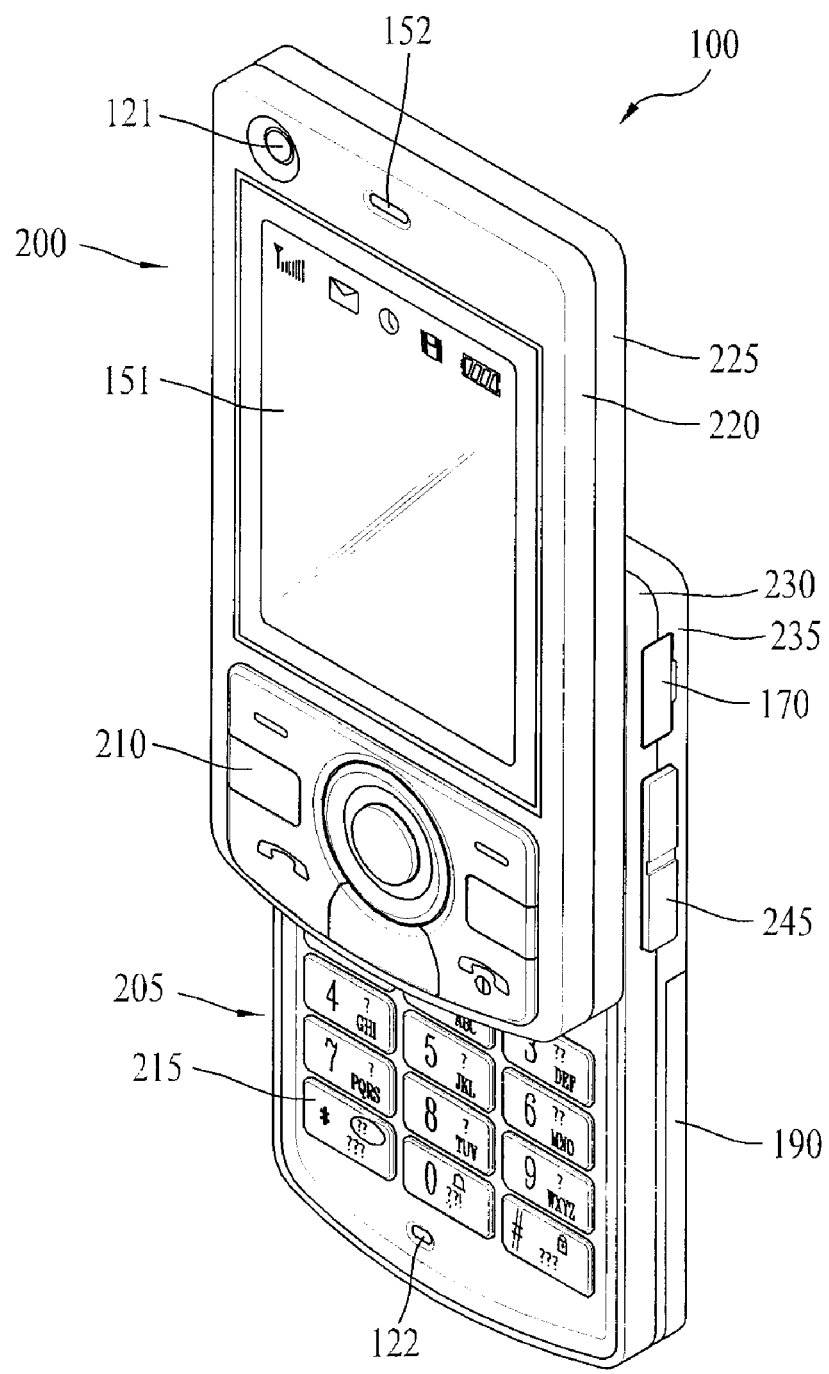
FIG. 2 is a front perspective view of a mobile terminal according to an embodiment of the present invention.

FIG. 2 is a front perspective view of a mobile terminal according to an embodiment of the present invention. As shown, the mobile terminal 100 includes a first body 200, and a second body 205 configured to slidably cooperate with the first body 200 in at least one direction. For a folder-type mobile terminal, the mobile terminal 100 may include the first body 200, and the second body 205 configured to have at least one side folded or unfolded with respect to the first body 200.

Also, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position). In addition, when the mobile terminal is a folder-type mobile terminal including a first body and a second body having one side folded or unfolded with respect to the first body, the folded state of the second body can be referred to as the closed configuration, whereas the unfolded state of the second body can be referred to as the open configuration.

In addition, when the mobile terminal is a swing-type mobile terminal including a first body and a second body capable of being swung with respect to the first body, the state that the first body is overlapped with the second body can be referred to as the closed configuration whereas the state that the second body is swung thus to make the first body partially exposed can be referred to as the open configuration. Also, even though a specific description is not given of the folder-type mobile terminal and the swing-type mobile terminal with respect to FIGS. 2 and 3, it can be easily understood by those skilled in the art and thus a detailed description thereof will not be repeated.

In addition, the mobile terminal may be operable in a standby (idle) mode when in the closed configuration, but this mode can be released by the user's manipulation. Also, the mobile terminal may be operable in an active (phone call) mode in the open configuration. This mode may also be changed into the idle mode according to the user's manipulation or after a certain time elapses. As shown in FIG. 2, a case (housing, casing, cover, etc.) forming the outside of the first body 200 is formed by a first front case 220 and a first rear case 225. In addition, various electronic components may be disposed in a space between the first front case 220 and the first rear case 225. One or more intermediate cases may additionally be disposed between the first front case 220 and the first rear case 225.

Further, the cases can be formed of resin in a manner of injection molding, or formed using metallic materials such as stainless steel (STS) and titanium (Ti). Also, a display module 151, an audio output module 152, a camera 121 or a first user input unit 210 may be disposed at the first front case 220 of the first body 200. In addition, the display module 151 may include LCD, OLED, and the like, which can visibly display information. The display module 151 and a touchpad can also be layered with each other such that the display module 151 can be configured to function as a touch screen so as to allow a user to input information in a touching manner.

Further, the audio output module 152 may be implemented as a speaker, and the camera 121 may be implemented to be suitable for a user to capture still images or video. In addition, like the first body 200, a case configuring the outside of the second body 205 may be formed by a second front case 230 and a second rear case 235. Also, the second user input unit 215 may be disposed at the second body 205, and in more detail, at a front face of the second front case 230. A third user input unit 245, a microphone 122 and an interface unit 170 may also be disposed either at the second front case 230 or at the second rear case 235.

Further, the first to third user input units 210, 215 and 245 may be referred to as a user input unit. Any tactile manner that a user can touch, e.g., the display 151, for manipulation can be employed for the user input unit. For example, the user input unit can be implemented as a dome switch or touchpad which a user can input information in a pushing or touching manner, or implemented in a manner of using a wheel, a jog or a joystick to rotate keys.

Regarding each function, the first user input unit 210 can be used for inputting commands such as START, END, SCROLL or the like, and the second user input unit 215 can be used for inputting numbers, characters, symbols, or the like. The first user input unit 210 may also include so-called soft keys used in cooperation with icons displayed on the display module 151, and navigation keys (usually composed of four navigation keys and a central key) for indicating and confirming an orientation. Also, the third user input unit 245 can be operated as a hot key for activating a specific function within the mobile terminal, and the microphone 122 may be implemented to be suitable for receiving user's voice or various sounds.

In addition, the interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a BLUETOOTH port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like. The power supply 190 may be disposed at a side of the second rear case 235 to provide power to the mobile terminal, and may be a rechargeable battery, for example, to be attachable/detachable for charging.

Figure 3:
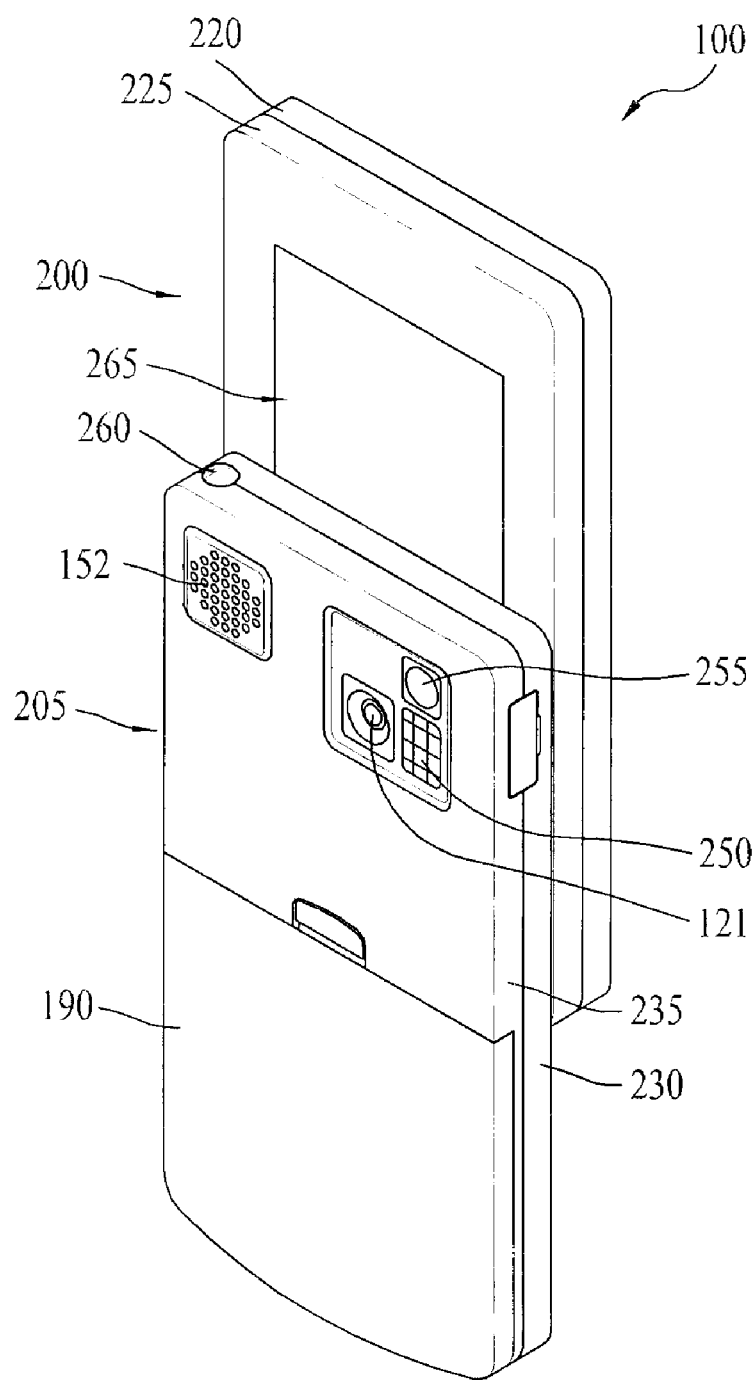
FIG. 3 is a rear perspective view of a mobile terminal according to an embodiment of the present invention.

Next, FIG. 3 is a rear perspective view of the mobile terminal according to an embodiment of the present invention. As illustrated in FIG. 3, a camera 121 may further be disposed at a rear face of the second rear case 235 of the second body 205. In addition, the camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use. Also, a flash 250 and a mirror 255 may additionally be disposed adjacent to the camera 121 of the second body 205. The flash 250 operates in conjunction with the camera 121 of the second body 250 when taking a picture using the camera 121 of the second body 205. In addition, the mirror 255 can cooperate with the camera 121 of the second body 205 to allow a user to photograph himself in a self-portrait mode.

The second rear case 235 may further include an audio output module 152. Also, the audio output module 152 of the second body 205 can cooperate with the audio output module 152 of the first body 200 to provide stereo output. In addition, the audio output module 152 may be configured to operate as a speakerphone. A broadcast signal receiving antenna 260 may also be disposed at one side of the second rear case 235, in addition to an antenna for communications. The antenna 260 can be configured to retract into the second body 205. One part of a slide module 265 which allows the first body 200 to be slidably coupled to the second body 205 may be disposed at the first rear case 225 of the first body 200.

Further, the other part of the slide module 265 may be disposed at the second front case 230 of the second body 205, such that it may not be exposed to the exterior as illustrated in the drawing of the present invention. As such, it has been described that the camera 121 is disposed at the second body 205; however, the present invention is not limited to the configuration. For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may also be configured to operate within a communication system which transmits data via frames or packets, including both wireless and wireline communication systems, and satellite-based communication systems. Hereinafter, a communication system within which the mobile terminal related to the present invention can operate will be described with reference to FIG. 4. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
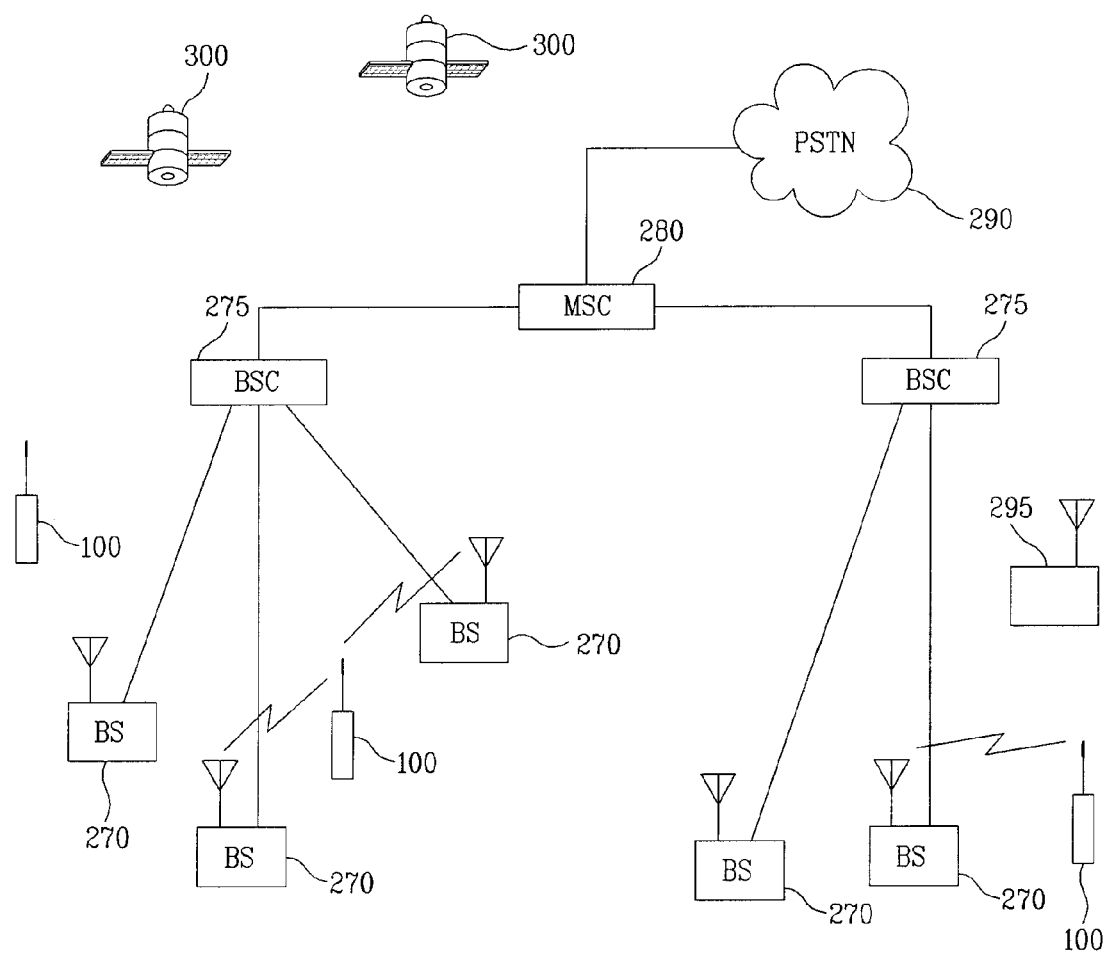
FIG. 4 is a block diagram of a wireless communication system with which the mobile terminal according to an embodiment of the present invention is operable.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or XDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station " may be used to refer collectively to a BSC 275, and one or more base stations 270. The base stations may also be denoted as "cell sites." Alternatively, individual sectors of a given base station 270 may be referred to as cell sites. A broadcasting transmitter (BT) 295, as shown in FIG. 4, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) can also be configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Figure 5:
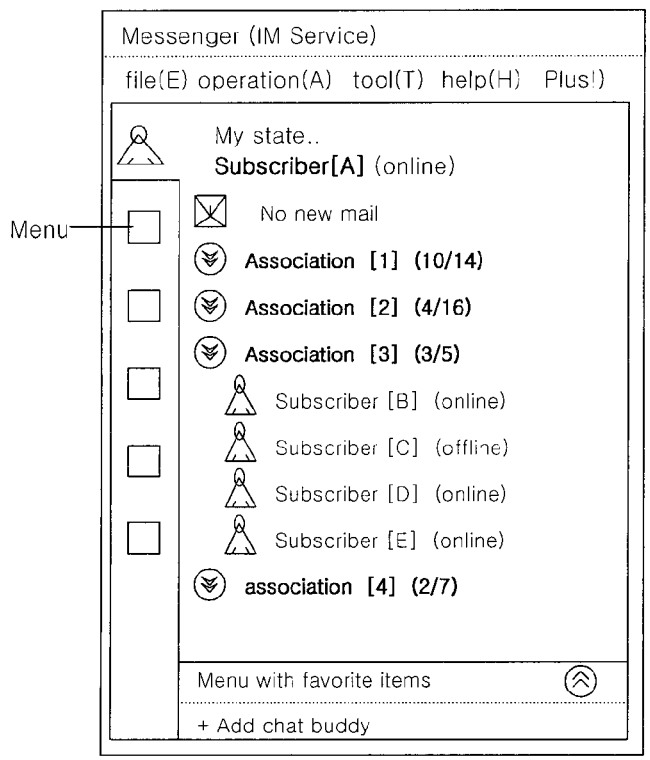
FIG. 5 is an overview of a display screen illustrating instant messaging (IM) services.
Figure 6:
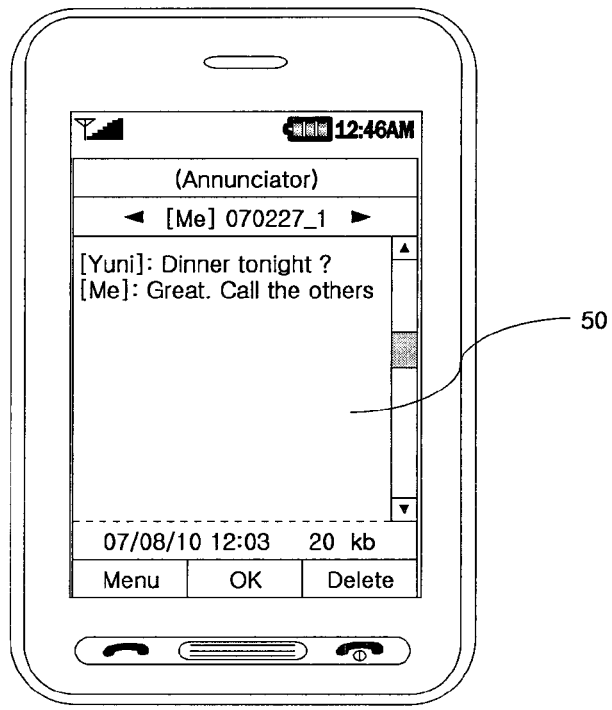
FIG. 6 is an overview of a display screen illustrating a text chatting session between designated particular subscribers in FIG. 5.

Next, FIG. 5 is an overview of a display screen illustrating an instant messaging (IM) service, and FIG. 6 is an overview of a display screen illustrating a text chatting session being performed on the mobile terminal with a designated client. As shown in FIG. 5, when the user starts the IM service or session on their terminal, an IM display screen is displayed listing different users that can be included in a chat session. FIG. 5 illustrates the subscribers B, D and E being online, and the subscriber C being offline. Thus, the user (i.e., subscriber A) can conduct IM sessions with the subscribers B, D and E in this example.

FIG. 6 illustrates the user initiating a chatting session with the subscriber B (i.e., by selecting the subscriber B from the display screen shown in FIG. 5). That is, when the subscriber A starts the IM service, the mobile terminal executes an IM program to display an IM service screen image (messenger) as shown in FIG. 5 on the display module 151. Then, when the subscriber A selects a desired client, e.g., the subscriber B, for chatting, the controller 180 displays a message window 50 on the display module 151 as shown in FIG. 6. The subscriber A then transmits and receives messages to and from the subscriber B using text (i.e., the subscriber A communicates with the subscriber B), and the messages exchanged between the users A and B are displayed in real time on the message window 50 as shown in FIG. 6.

In this state, the subscriber A or the subscriber B can designate particular information (e.g., a word, phone number, place, time, address, account number, etc.) of the chat content and store the same in a message inbox so that the subscriber can later recall the stored information. Also, when the subscriber A designates or selects particular information of the content in the message window 50, the corresponding particular information or the part where the corresponding particular information is present can be automatically stored in the message inbox. The particular information or the part where the particular information is present is also stored in a tag form.

Further, the particular information may be designated by a key manipulation or touch action (e.g., actual touch or proximity touch), or the user may set the designation of the particular information form a menu. Voice activation features may also be utilized to designate particular information. In addition, the part including the particular information may be designated at an early stage by the user. For example, the front and rear lines based on the line where the particular information is present may also be set to be stored such that the user can more easily remember the context of the chatting session in which the particular information was designated.

Figure 7:
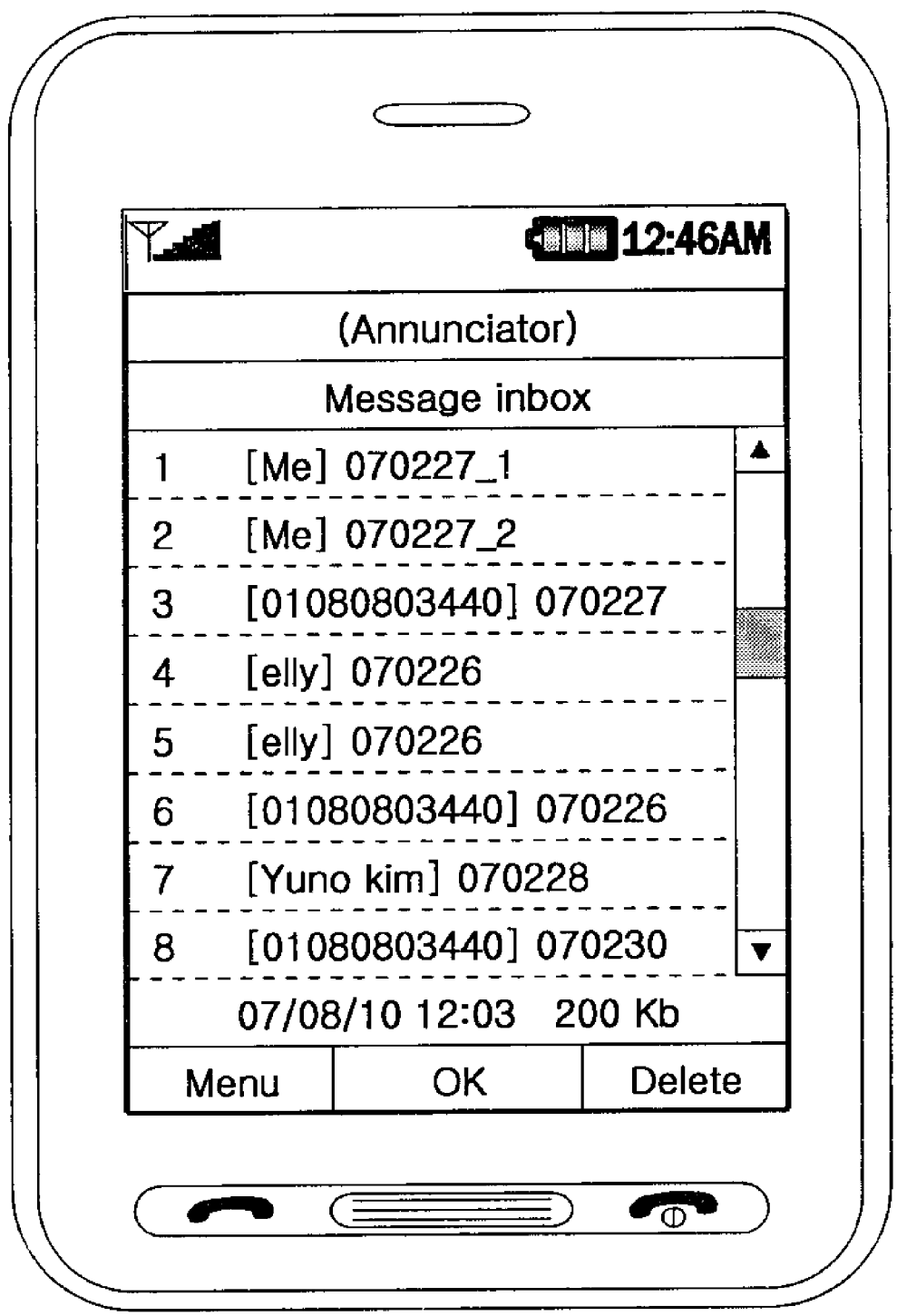
FIG. 7 is an overview of a display screen illustrating a message inbox according to an embodiment of the present invention.

Next, FIG. 7 is an overview of a display screen illustrating a message inbox according to an embodiment of the present invention. In particular, FIG. 7 illustrates a plurality of chat sessions the subscriber A has conducted with other subscribers. Thus, in the message inbox shown in FIG. 7, the user can search chat content for particular information he or she has previously designated. The present invention provides one or more effective embodiments for searching chat content. For example, a first embodiment of the present invention is applied to searching desired chat content by inputting particular information in the message inbox. Namely, in the first embodiment, when the user inputs particular information (e.g., a word, place, phone number, etc.) in the message inbox, chat content including the corresponding information is shown to allow the user to find a place or phone number the user remembers vaguely. The user can input the desired information to be searched via a menu option provided on the message window or by directly inputting information in a search box.

A second embodiment is applied to where the user searches a chat list by scrolling the scroll bar in the message inbox. In other words, in the second embodiment, when the user scrolls through the chat list by scrolling a scroll bar in the message inbox, a portion designated by the user is displayed in a preview form in each list, so that the user can recognize desired chat content without having to select content of each list one by one.

Figure 8:
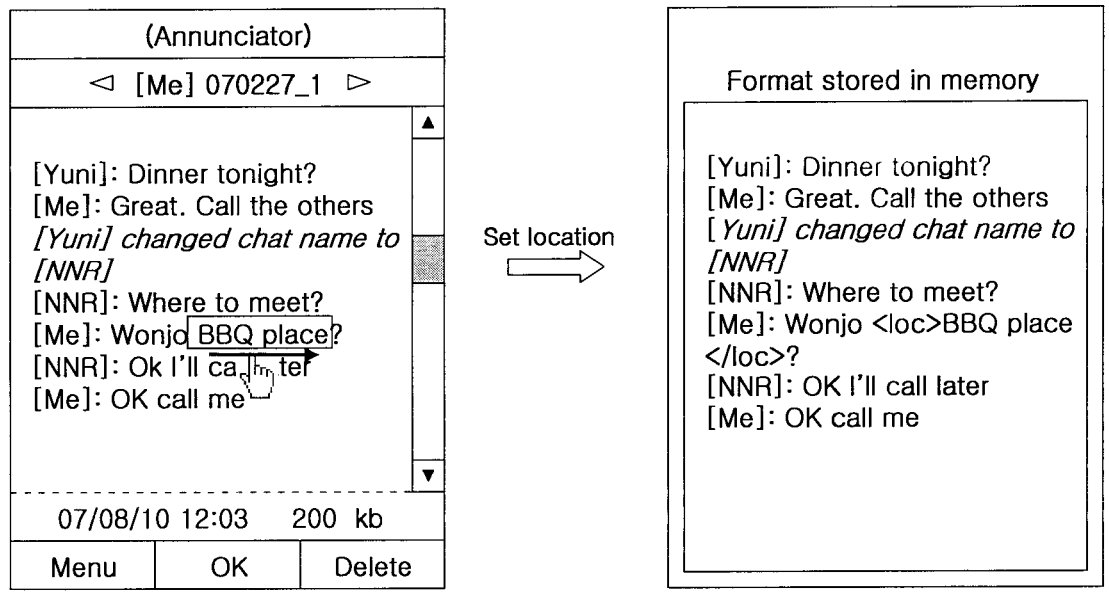
FIG. 8 includes overviews of display screens illustrating a user designating a place as particular information to be stored according to a first embodiment of the present invention.

Next, FIG. 8 includes overviews of display screens illustrating the user designating a place as particular information to be stored according to the first embodiment of the present invention. With reference to FIG. 8, the user can designate content related to a place, e.g., 'the name of a restaurant (Wonjo BBQ place)' in the message window 50. In FIG. 8, the user has only designated the phrase "BBQ place " because he or she knows the BBQ place is the Wonjo BBQ place. The user can also designate the entire phrase "Wonjo BBQ place " if desired. Further, as discussed above, the user can designate the content related to the place through a key manipulation or touch action, or by using the appropriate menu option provided by the mobile terminal.

Then, when the user designates the content related to the place, the controller 180 stores the designated content in a tag form in the memory 160. Further, when the name of a restaurant is touched, the controller 180 can also recognize that the corresponding content has been designated, and automatically perform a storing operation. Similarly, when the user designates a name of food, the controller 180 can recognize that the corresponding word has been designated, and in this state, if the corresponding word is touched one more time or dragged, the controller 180 can perform the storing operation. The user can also designate particular information and then request the controller 180 store the designated information using an appropriate menu option. Thus, FIG. 8 illustrates the user designating particular information, the controller 180 storing the designated information, and then continuing with the chatting session. The designated information is also stored using tags (e.g., "<loc> in this example).

Figures 9, 10:
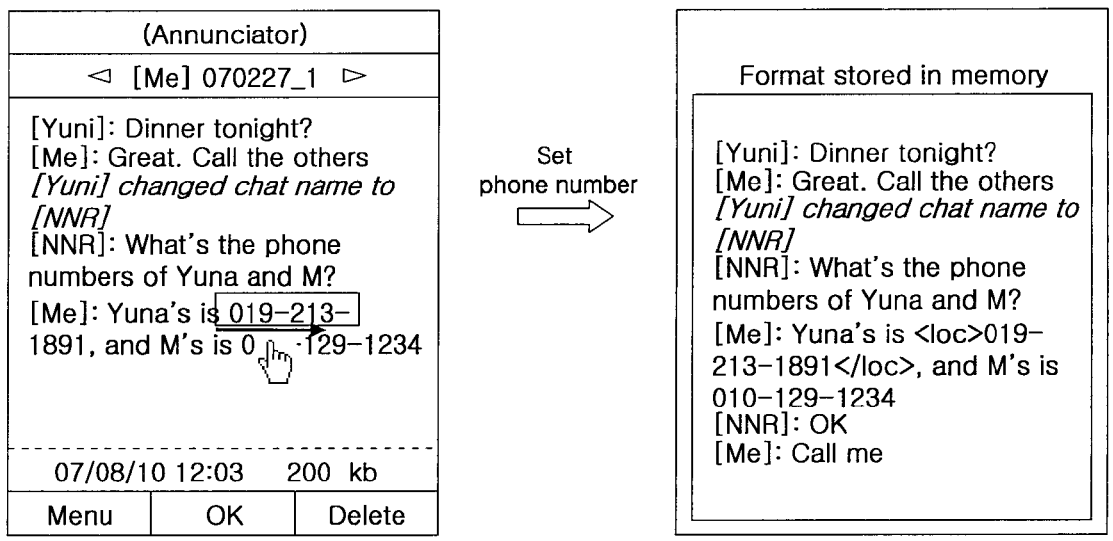
FIG. 9 includes overviews of display screens illustrating a user designating a phone number to be stored as particular information according to the first embodiment of the present invention.
FIG. 10 is an overview illustrating different items that can be designated as particular information to be stored according to the first embodiment of the present invention.

Next, FIG. 9 includes overviews of display screens illustrating the user designating a phone number as particular information to be stored according to the first embodiment of the present invention. This embodiment is similar to the embodiment of FIG. 8, except that the designated item is a phone number, not a place, so its detailed information will be omitted. In addition, the user can designate other types of information besides the place and phone number as shown in FIGS. 9 and 10.

For example, FIG. 10 is an overview illustrating different items that the user can designate as particular information to be stored according to the first embodiment of the present invention. That is, the user can designate a word, time, address, an account number, and the like, as particular information to be stored. Also, in the present invention, a new item may be additionally designated as necessary. Further, as discussed above, the controller 180 can determine the type of designated information such as a restaurant name, a place, a phone number, etc. and then automatically store the designated information when the designated information is recognized as being information that is to be automatically stored.

Figures 11A, 11B, 11C:
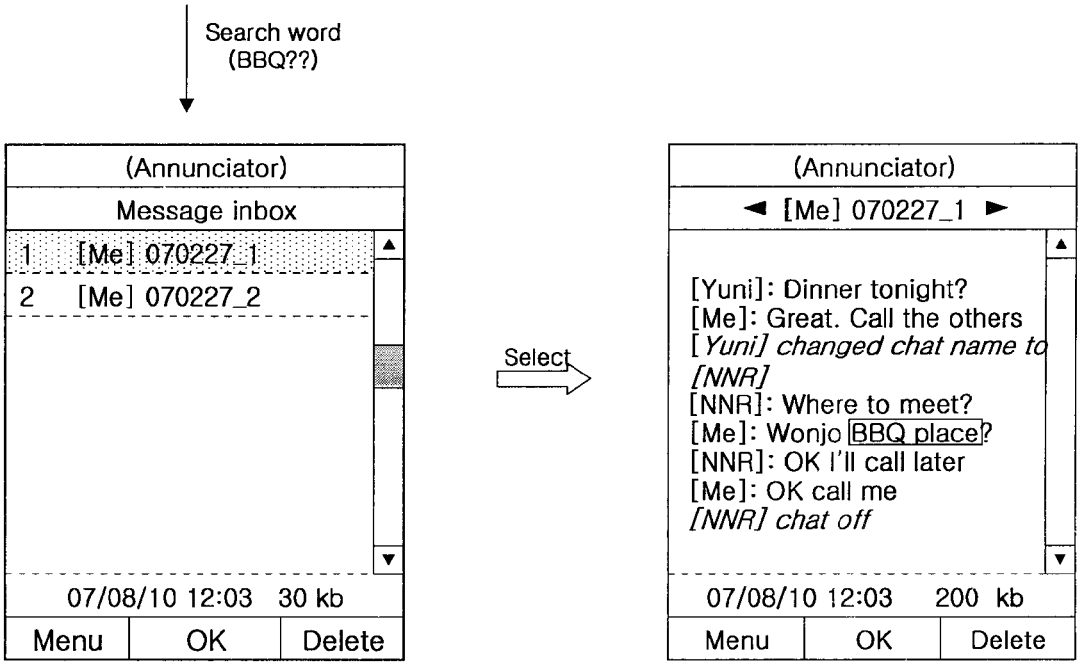
FIGS. 11A to 11C are overviews of display screens illustrating a user searching for designated information related to a place after the chatting session is finished according to the first embodiment of the present invention.

Next, FIGS. 11(A) to 11(C) are overviews of display screens illustrating the user searching designated information related to a place among a plurality of chatting sessions according to the first embodiment of the present invention. As shown in FIG. 11(A), the user may select a menu in the message inbox to input a particular word that he or she wants to search for. For example, the user can select a 'menu' option and input the name of a restaurant, for example, 'BBQ ??', as a search word. The controller 180 then searches chat content stored in a tag or text form in the memory 160 and displays a list of previous IM sessions including the word 'BBQ' as shown in FIG. 11(B). The user can also enter the desired search information via a search window or search box.

Then, when the user selects one list '[It's me] 070227__1' from the displayed two lists of the message inbox in FIG. 11(B), the controller 180 displays the entire chat content including the search word 'BBQ place' on the display unit 151 as shown in FIG. 11(C). The search word 'BBQ place' is displayed such that it is visually discriminated from the other text (e.g., underlined or in a bold type). The user can then select the corresponding search word and make a phone call to a counterpart user who mentioned the restaurant, or store a phone number of the counterpart in a phone book. FIG. 11(B) also shows two or more lists of the message inbox include the particular word ('BBQ place'). However, if there is only one list, the controller 180 can directly display the chat content (e.g., the display screen shown in FIG. 11(C) is directly displayed without displaying the display screen in FIG. 11(B)).

Next, FIGS. 12(A) and 12(B) are overviews of display screens illustrating a summary of each list being displayed when the user scrolls through the message inbox according to the second embodiment of the present invention. Thus, as described above, in the second embodiment of the present invention, when the user scrolls through a chat list in the message inbox, the controller 180 display a summary of the chat content including the searched word in a preview form. Thus, as the user is scrolling through the chat list, he or she can see information identified during the corresponding chat session.

Further, the summary can be displayed through a key manipulation or touch or the user may designate the summary option from the menu. Thus, as shown in FIG. 8, when the user designates particular information, e.g., a 'name of a restaurant (BBQ place)', included in chat content through a touch action in the message window 50, the controller 180 stores the designated 'BBQ place' in the form of a tag. Then, when the user scrolls through the chat list, the controller 180 displays a summary of the portion previously designated on an additional window 51. Further, the summary display option can be set by the user using the appropriate menu option on the terminal (e.g., the user can turn on or off the summary display option). The summary display option can also be automatically performed without user intervention (e.g., the manufacturer of the terminal can preset this option to always occur).

Further, in the first and second embodiments of the present invention, when the user designates particular information and the information is stored, the displaying of list of the message inbox can be controlled. For example, if the user does not set list display feature in an initial menu, the controller 180 can display the message inbox list according to priority (e.g., in the order of place, time and phone number). In addition, when the list is displayed according to priority, the displayed list may be changed according to the number of searches. Namely, if the same list is repeatedly searched, the list may be first displayed in the order of place, time and phone number according to priority and then the list may be changed to be displayed in the order of time, phone number and place. Also, if the user additionally sets a list display in the initial menu, the controller 180 displays the list according to a user setting.

Thereafter, as shown in FIG. 12(B), when the user scrolls through each list using the scroll bar, the controller 180 displays a summary of each list on the additional window 51. For example, the controller 180 can discriminate information stored in the form of a tag, for example, a list including 'BBQ place', and summarize chat content to display the summary on the additional window 51. In this instance, the controller 180 summarizes the chat content based on the user designated part (e.g., place, word, time, contact number, address, account number, etc.) according to a user setting and displays the information in a preview form, rather than unconditionally displaying first several lines of the chat content.

In another example, the controller 180 can provide a preview of all the lists when the user scrolls through each list using the scroll bar. In this instance, if the user designates an interested part (e.g., a place, word, time, contact number, address, account number, etc.), chat content is summarized based on the designated part so as to be displayed in preview form, and if there is not any setting, a first part of the chat content is displayed as a default.

In another embodiment of the present invention, one or more summaries may be simultaneously displayed. Namely, a plurality of previews may be simultaneously displayed. If the plurality of previews are displayed on separate windows, the size of each preview window may be set to be different. For example, the size of a preview windown may be set such that a preview of a currently searched list is the largest. In addition, if the sizes of the plurality of preview windows are equal, the windows may be displayed in an overlap manner. Also, in another embodiment of the present invention, only a certain number of preview windows may be displayed. Namely, when the number of preview windows exceed a certain number, the windows may disappear in the order of their display time, and two or more preview content may be combined. In addition, in still another embodiment of the present invention, when a plurality of preview screen images are displayed, the user can remove a displayed window by touching the window. In yet another embodiment of the present invention, when certain information is designated, its summary may be previously stored, and then be displayed as it is when list is searched.

Figure 13:
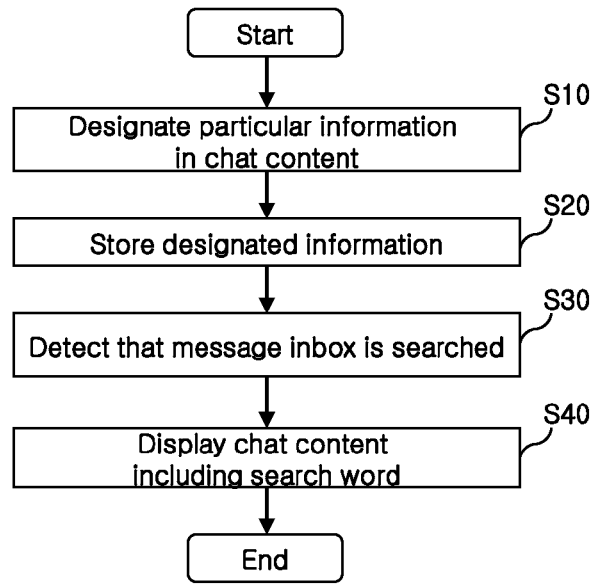
FIG. 13 is a flow chart illustrating a method of displaying content of message inbox of a mobile terminal according to the first embodiment of the present invention.

Next, FIG. 13 is a flow chart illustrating a method of displaying content of a message inbox of a mobile terminal according to the first embodiment of the present invention. As shown in FIG. 13, while chatting or while searching chat content of the message inbox, the user can designate particular information (e.g., a word, place, time, phone number, address, account number, etc.) through a key manipulation or a touch input (S10). When particular information is designated by the user, the controller 180 stores the corresponding information in a tag or text form in the message inbox of the memory 160 (S20).

Thereafter, when the user opens the message inbox and inputs a particular search word on the chat content of the message inbox, detailed chat content of a list including the input search word is displayed on the display unit 151 (S20 and S40). At this time, if there is one list including the input search word, its detailed chat content is immediately displayed, and if there are two or more lists, lists including the first input search word are displayed and then detailed chat content of a list selected by the user is displayed.

Figure 14:
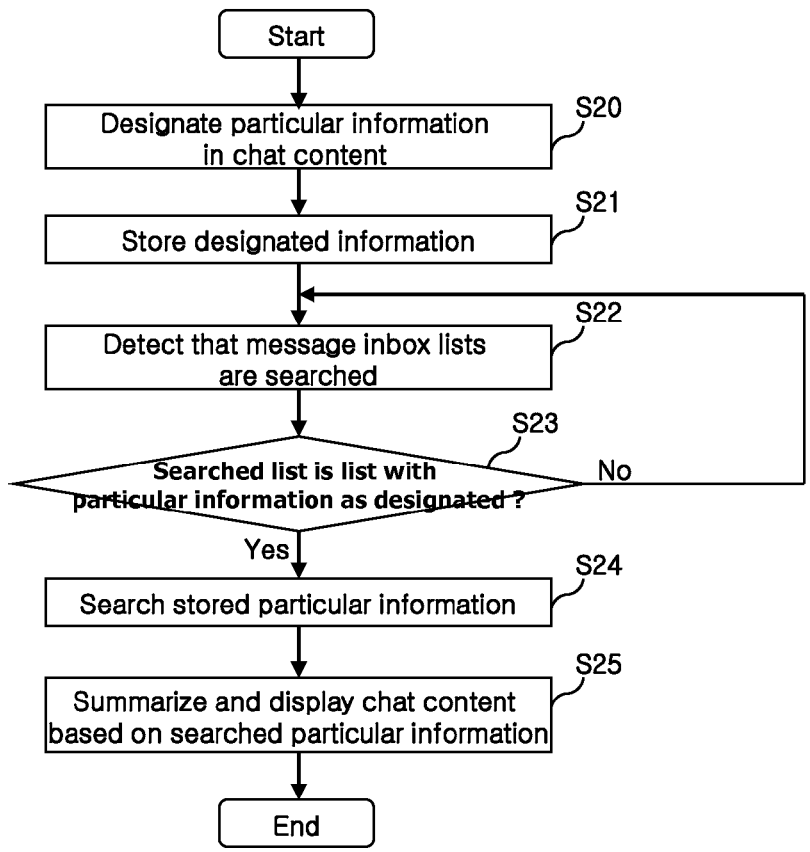
FIG. 14 is a flow chart illustrating a method of displaying content of message inbox of a mobile terminal according to the second embodiment of the present invention.

Next, FIG. 14 is a flow chart illustrating a method of displaying content of message inbox of a mobile terminal according to the second embodiment of the present invention. With reference to FIG. 14, while the user is chatting or is searching chat content of the message inbox, he or she may designate particular information (e.g., a word, place, time, phone number, address, account number, etc.) through a key manipulation or a touch input (S50).

When the user designates particular information, the controller 180 stores the particular information in a tag or text form in the message inbox of the memory 160 (S51). When the particular information is stored, the controller 120 summarizes chat content including the corresponding information as well as the corresponding information. When the chat content is summarized and stored, as shown in FIG. 12, one front line and one rear line based on 'BBQ place' may be stored, rather than unconditionally storing some first lines of the chat content.

Thereafter, when the user searches the message inbox list by scrolling the scroll bar in the message inbox (S52), the controller 180 checks whether a searched list is a list including the particular information as designated (i.e., including the information stored in a tag form) (S53). If the searched list is the list including the particular information as designated (Yes in S53), the controller 180 searches a position of the particular information stored in the tag form (e.g., 'BBQ place' in FIG. 12), summarizes one front line and one rear line of chat content based on 'BBQ place' and displays the information on a separate window as shown in FIG. 12 (S54 and S55).

Further, if the summary is stored together when the particular information is stored, the controller 180 displays the stored summary on a separate window during the list searching feature. Namely, when a previously summarized part is stored, the controller 180 displays the summarized chat content when a summarized list is searched, and if only the particular information is stored, chat content is summarized based on the corresponding information stored in the tag form to provide a preview when a list is searched. Further, the first and second embodiments of the present invention are operated separately, but the first embodiment may be first performed to display a plurality of lists including particular information and then a preview may be provided when a corresponding list is searched.

Next, FIGS. 15(A) to 15(D) are overviews of display screens illustrating the user designating content related to a schedule, and the controller 180 automatically updating a scheduler according to an embodiment of the present invention. As shown in FIGS. 15(A) and 15(B), when the user searches chat content during chatting or from the message inbox, and if the user designates a schedule or time-related information, e.g., '7:00 p.m.', the controller 180 stores the corresponding information in a tag form as (<Schedule>7:00 p.m. </Schedule>) in the memory 160. Thereafter, when as shown in FIG. 15(C), if the user searches the message inbox list by scrolling the scroll bar in the message inbox, the controller 180 displays summaries of each searched list as described above.

Further, when the user selects a 'schedule update' menu (e.g., a submenu of the search menu) in the message inbox, the controller 180 searches information stored in a tag form as shown in FIG. 15(D) to automatically update a scheduler of the mobile terminal. In this instance, time or schedule information is displayed on the scheduler, and when the user designates corresponding schedule information through a key manipulation or touch action, the controller 180 displays the summary in a preview form in the same manner as in the message inbox.

As so far described, in embodiments of the present invention, when lists are scrolled using the scroll bar in the message inbox, a summary of a list including designated information is displayed in a preview form. Thus, the user can quickly and easily search desired information without having to search chat content one by one from the message inbox list. Further, in an embodiment of the present invention, the above-described method can be implemented as software codes that can be read by a computer in a program-recorded medium. The computer-readable medium may include various types of recording devices in which data that can be read by a computer system is stored. The computer-readable medium may include a ROM, a RAM, a CD-ROM, a magnetic tape, a floppy disk, an optical data storage device, and the like. The computer-readable medium also includes transmission via the Internet. In addition, the computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of controlling a mobile terminal, the method comprising:
    establishing a messaging session with at least one other terminal;
    designating a portion of information included in chat content input during the messaging session;
    storing the designated portion of information in a memory of the mobile terminal, the designated portion of information including scheduling information;
    receiving an input search signal requesting a message inbox including at least one previous messaging session conducted on the mobile terminal be searched for the designated portion of information;
    searching the message inbox to determine if the at least one previous messaging session includes the designated portion of information upon receiving the input search signal, the at least one previous messaging session including a plurality of messaging sessions;
    displaying at least a part of chat contents of said at least one messaging session that includes the designated portion of information when the searching step determines said at least one previous messaging session includes the designated portion of information; and
    scrolling through the plurality of messaging sessions,
    wherein the displaying step displays said at least the part of the chat contents of each of the messaging sessions in a preview form that includes the designated portion of information as the plurality of message sessions are being scrolled through,
    wherein said at least the part of the chat contents in the preview form is automatically changed based on a position of the designated portion of information for each scrolled messaging session,
    wherein the displaying step displays a scheduler including the schedule information upon receiving an input signal requesting a schedule update through the message inbox and displays at least a part of chat contents of said at least one messaging session in a preview form that includes the designated portion of information when the schedule information in the scheduler is designated,
    wherein, when the displaying step simultaneously displays part of chat contents for at least two messaging sessions on separate windows, the size of each window is set to be different,
    wherein the method further comprises:
    displaying a list of previous messaging sessions that include the designated portion of information; and
    receiving a selection signal indicating a selection of one of the displayed list of previous messaging sessions,
    wherein the displaying said at least the part of the chat contents displays said at least the part of the chat contents of the selected one of the displayed list of previous messaging sessions, and
    wherein the displaying step displays said at least the part of the chat contents in a separate pop-up window.

2. The method of claim 1, wherein when the searching step determines there is only one messaging session that includes the designated portion of information, the displaying step immediately displays said at least the part of the chat contents of said only one messaging session that includes the designated portion of information without further user interaction.

3. The method of claim 1, wherein the displayed said at least the part of the chat contents includes at least one line in front of the designated portion of information and at least one line behind the designated portion of information.

4. The method of claim 1, wherein the designated portion of information includes at least one of a word, a phone number, a place, a time, an address, a schedule, and an account number.

5. The method of claim 1, wherein the portion of information is designated by pressing a key or applying a touch input on the portion of information.

6. The method of claim 1, wherein the storing step stores the designated portion of information in a tag form in the memory of the mobile terminal.

7. The method of claim 1, wherein the displaying step displays the plurality of messaging sessions according to predetermined priorities, and changes an order of the displayed plurality of messaging sessions according to a number of searches.

8. The method of claim 1, further comprising automatically updating a schedule function on the terminal to include the designated scheduling information.

9. A mobile terminal, comprising:
    a wireless communication unit configured to establish a messaging session with at least one other terminal;
    an input unit configured to receive a designation signal corresponding to a designation of a portion of information included in chat content input during the messaging session;

a memory configured to store the designated portion of information, the designated portion of information including scheduling information;

a controller configured to receive an input search signal requesting a message inbox including at least one previous messaging session conducted on the mobile terminal be searched for the designated portion of information, and to search the message inbox to determine if the at least one previous messaging session includes the designated portion of information upon receiving the input search signal, the at least one previous messaging session including a plurality of messaging sessions; and a display configured to display at least a part of chat contents of said at least one messaging session that includes the designated portion of information when the controller determines the search of said at least one previous messaging session includes the designated portion of information, wherein the controller is further configured to scroll through the plurality of messaging sessions based on an input, to display said at least the part of the chat contents of each of the messaging sessions in a preview form that includes the designated portion of information as the plurality of message sessions are being scrolled through, and to automatically change said at least the part of the chat contents in the preview form based on a position of the designated portion of information for each scrolled messaging session, wherein the controller is further configured to display a scheduler including the schedule information when an input signal requesting a schedule update is input, and to display at least a part of chat contents of said at least one messaging session in a preview form that includes the designated portion of information when the schedule information in the scheduler is designated, wherein, when the controller simultaneously displays part of chat contents for at least two messaging sessions on separate windows, the size of each window is set to be different, wherein the display is further configured to display a list of previous messaging sessions that include the designated portion of information, and the controller is further configured to receive a selection signal indicating a selection of one of the displayed list of previous messaging sessions, wherein the display is further configured to display said at least the part of the chat contents of the selected one of the displayed list of previous messaging sessions, and wherein the display is further configured to display said at least the part of the chat contents in a separate pop-up window.

10. The mobile terminal of claim 9, wherein when the controller determines there is only one messaging session that includes the designated portion of information, the display is further configured to immediately display said at least the part of the chat contents of said only one messaging session that includes the designated portion of information without further user interaction.

11. The mobile terminal of claim 9, wherein said at least the displayed part of the chat contents includes at least one line in front of the designated portion of information and at least one line behind the designated portion of information.

12. The mobile terminal of claim 9, wherein the designated portion of information includes at least one of a word, a phone number, a place, a time, an address, a schedule, and an account number.

13. The mobile terminal of claim 9, wherein the portion of information is designated by pressing a key or applying a touch input on the portion of information.

14. The mobile terminal of claim 9, wherein the controller is further configured to control the memory to store the designated portion of information in a tag form in the memory of the mobile terminal.

15. The mobile terminal of claim 9, wherein the controller is further configured to control the display to display the plurality of messaging sessions according to predetermined priorities, and to change an order of the displayed plurality of messaging sessions according to a number of searches.

16. The mobile terminal of claim 9, wherein the controller is further configured to automatically update a schedule function on the terminal to include the designated scheduling information.

* * * * *